United States Patent
Suonvieri

(10) Patent No.: US 6,718,158 B1
(45) Date of Patent: Apr. 6, 2004

(54) METHOD OF MONITORING OPERATION OF CELLULAR RADIO SYSTEM

(75) Inventor: Jukka Suonvieri, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/462,163

(22) PCT Filed: May 12, 1999

(86) PCT No.: PCT/FI99/00412
§ 371 (c)(1),
(2), (4) Date: Jan. 5, 2000

(87) PCT Pub. No.: WO99/59264
PCT Pub. Date: Nov. 18, 1999

(30) Foreign Application Priority Data

May 14, 1998 (FI) .................................................. 981077

(51) Int. Cl.[7] .......................... A04B 1/60; H04B 17/02; H04B 7/14; H04B 7/15; H04B 3/36
(52) U.S. Cl. .............................. 455/9; 455/7; 455/11.1
(58) Field of Search ............................ 455/7, 8, 9, 10, 455/11.1, 12.1, 13.1, 13.2, 13.3, 13.4, 14, 15, 16, 17, 18, 19, 20, 21, 22, 23, 24, 25; 370/315, 316, 317, 318, 319, 320, 321, 322, 323, 324, 325, 326, 327

(56) References Cited

U.S. PATENT DOCUMENTS 4,941,200 A * 7/1990 Leslie et al. .................. 455/17
6,072,988 A * 6/2000 Minegishi ..................... 455/62

FOREIGN PATENT DOCUMENTS

| WO | 96/11555 | 4/1996 |
| WO | 96/22635 | 7/1996 |
| WO | 98/29962 | 7/1998 |
| WO | 99/17476 | 4/1999 |

* cited by examiner

Primary Examiner—Vivian Chin
Assistant Examiner—Raymond B Persino
(74) Attorney, Agent, or Firm—Pillsbury Winthrop LLP

(57) ABSTRACT

The present invention relates to a method of monitoring the operation of a cellular radio system in a system comprising at least a first base station and a repeater adapted to repeat signals sent by the first base station on traffic channels. In order for the management system to be able to detect malfunction more promptly and easily than before, the method comprises steps in which: the repeater is adapted to receive a traffic channel list sent by the base station, the traffic channels included in the traffic channel list are compared with the traffic channels used by the repeater, and an alarm is given if the traffic channels used by the repeater differ from the traffic channels included in the traffic channel list.

12 Claims, 2 Drawing Sheets

METHOD OF MONITORING OPERATION OF CELLULAR RADIO SYSTEM

This application is the national phase of international application PCT/FI99/00412 filed May. 12, 1999 which designated the U.S.

BACKGROUND OF THE INVENTION

The present invention relates to a method of monitoring the operation of a cellular radio system in a system comprising at least a base station and a repeater tuned to repeat signals sent by the base station on traffic channels, and in which system the base station sends over the radio path a traffic channel list including traffic channels at its disposal. The invention further relates to a repeater in a cellular radio system, the repeater comprising: amplifier units for receiving, amplifying and forwarding signals sent by a first base station on traffic channels, and a transceiver unit for setting up a signalling connection to other system parts to transfer control signals between the repeater and other network parts.

DESCRIPTION OF RELATED ART

A problem associated with known cellular radio systems is management of the repeaters used in the system. In known systems, repeaters inform their configurations to other network parts only when required by the management system. Consequently, in reconfiguration of system traffic channels, for example, situations may arise when a repeater is tuned by mistake e.g. to the wrong traffic channels or its tuning is completely neglected, leaving it on old traffic channels. In this case, because of the wrong traffic channels, the repeater is no longer able to repeat traffic channels of the base station it should repeat. Since known repeaters inform their configuration only when required, a repeater may remain for a long time on the wrong traffic channels before the management system detects the mistake e.g. because of impaired audibility within a given network area.

SUMMARY OF THE INVENTION

Aspects of the present invention are to solve the above problem and to provide a solution for enhancing and facilitating the monitoring of the operation of a cellular radio system. These aspects are achieved by a method in which a repeater is adapted to receive a traffic channel list sent by the base station, the traffic channels included in the traffic channel list are compared with the traffic channels used by the repeater, and an alarm is given if the traffic channels used by the repeater differ from the traffic channels included in the traffic channel list.

The invention also relates to a repeater in a cellular radio system for applying the method of the invention. The repeater includes a transceiver unit that is adapted to receive a traffic channel list sent by the first base station over the radio path and that includes all traffic channels at its disposal. The repeater also includes comparison means for comparing the traffic channels included in the traffic channel list with the channels used by the amplifier units, and the transceiver unit includes means for sending a predetermined message to a management system of the system when the comparison means indicate that the channels used by the amplifier units of the repeater differ from the traffic channels included in the traffic channel list.

In this context the concept traffic channel list refers to a list sent by a base station over the radio path and which includes traffic channels allocated to the use of the base station. For example in the GSM system (Global System for Mobile communications), base stations send in accordance with GSM specification part 04.08 on a BCCH channel (Broadcast Control CHannel) a Base Allocation list indicating said information.

The invention is based on an idea to significantly enhance and facilitate the management of a cellular radio system, once system repeaters are adapted to monitor the traffic channels used by corresponding base stations. In accordance with the invention, each repeater is adapted to receive a traffic channel list sent by the corresponding base station over the radio path. In this case the repeater immediately detects possible malfunction, i.e. a situation where the channels included in the traffic channel list differ from the channels used (repeated) by its amplifier units. In this situation the repeater immediately sends information on the detected malfunction to the management systems of the system. The repeater may simultaneously monitor the operation of the corresponding base station. That is, in case of malfunction of a base station, a repeater detects it because it is no longer able to receive signals sent by the base station. Also in this situation the repeater reports this to the management system of the system. Thus the most significant advantages of the method and repeater of the invention are that the repeaters are able to independently detect a situation in which they are tuned to repeat the wrong channels, that the repeaters are able to monitor the operation of the corresponding base station, and that the repeaters are able to send on their own initiative information to the management system about a malfunction they have detected, whereby the management system (and operator) detect a malfunction more rapidly and easily than previously.

In one specific embodiment of the method of the invention, the repeater is adapted to measure signal strengths of signals transmitted by base stations audible to it, the measured signal strengths are compared with each other, and an alarm is given if the comparison indicates that the strongest signals received by the repeater have been sent by some other base station than said first base station. This embodiment of the invention enables monitoring of the operation of the base stations in the system. In addition to being able to monitor the operation of the corresponding base station (i.e. the base station whose signals it repeats), the repeater may simultaneously also monitor the operation of other base stations in the system. This may take place by the repeater maintaining in its memory a list of the strongest base stations audible to it, and at given intervals make control measurements in order to find out if the audibility of the base stations has changed. If in this case a base station is significantly less audible than previously (or not at all), the repeater may send information about this to the management system.

BRIEF DESCRIPTION OF THE DRAWINGS

In the following embodiments of the invention will be described in greater detail by way of example with reference to the attached drawings, in which.

DETAILED DESCRIPTION OF EMBODIMENTS OF THE INVENTION

Figure 1:
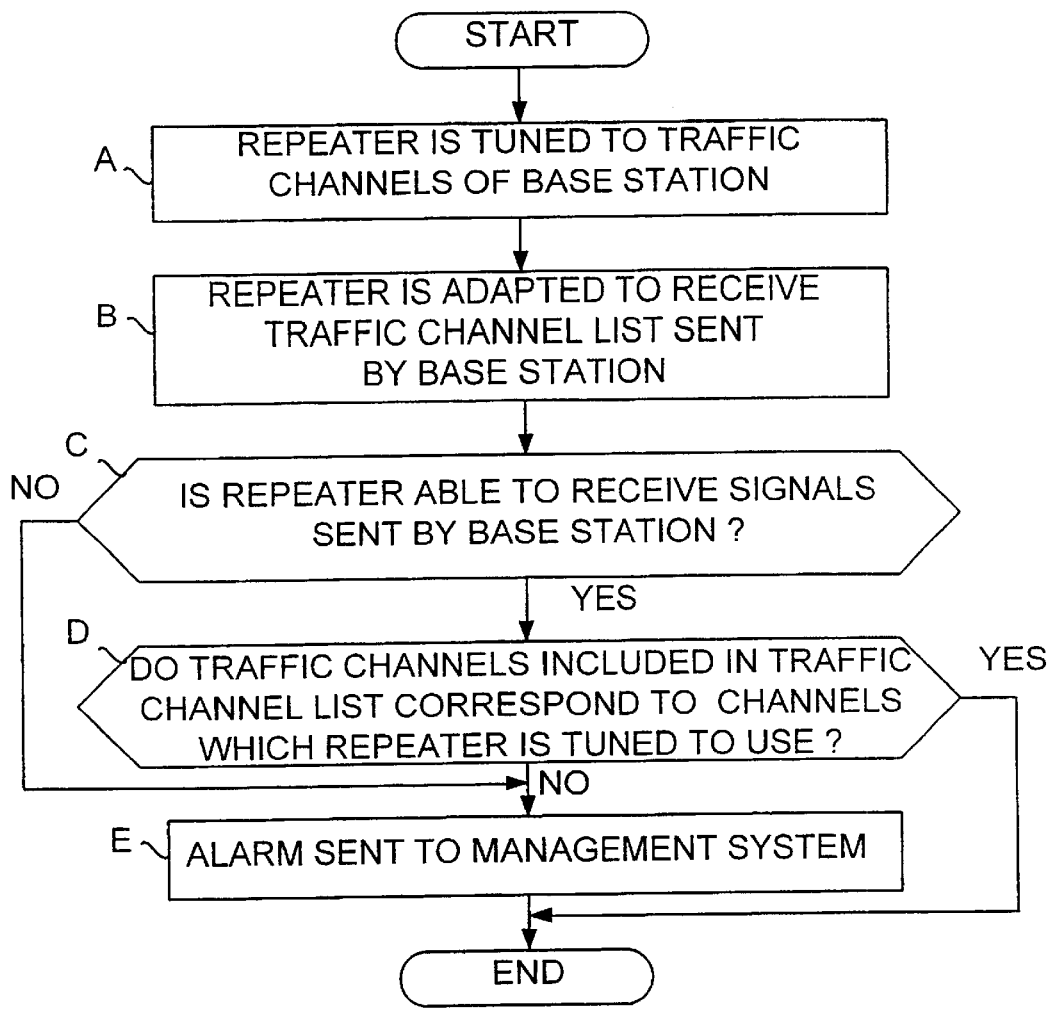
FIG. 1 is a flow chart showing a method in accordance with principles of the invention.

FIG. 1 is a flow chart of a method in accordance with principles of the invention. The flow chart of FIG. 1 is applicable to the GSM system, for example.

In block A a repeater is tuned to repeat the traffic channels of a base station. Tuning may be carried out in any manner known per se; for example by the network management system sending to the repeater a control command over the radio path, whereby the control unit of the repeater adjusts the amplifier units of the repeater to use the frequency channels given in the control command.

In block B the repeater is adapted to receive a traffic channel list sent by the base station. In the GSM system, for example, base stations send on a BCCH channel cell related general information including e.g. information about the frequency channels utilized by the traffic channels of said cell.

In block C a check is made to see if the receiver is able to receive signals sent by the first base station. Should it be detected that the repeater is unable to receive the BCCH channel of the base station or the traffic channel list sent on said channel by the base station, this indicates a malfunction either at the base station or the repeater. In this case the process proceeds to block E in which the management system of the system is given an alarm.

If in block C the repeater is able to receive signals sent by the base station, the process proceeds to block D, where a check is made to see if the channels included in the traffic channel list correspond to the channels the amplifier units of the repeater are tuned to repeat. If not, the process proceeds to block E where an alarm message is sent to the management system.

In applying the flow chart of FIG. 1, an alarm message is sent to the management system in e.g. the following situations:

1) the repeater is tuned to the wrong frequency channels, i.e. the frequency channels it repeats differ from the frequency channels used by the corresponding base station,
2) the repeater lacks amplifier units, i.e. the base station has at its disposal a greater number of frequency channels than is the number of amplifier units in the repeater,
3) the repeater does not hear the base station, i.e. the repeater is unable to receive a traffic channel list from the base station,
4) the repeater has too many amplifier units in use.

Figure 2:
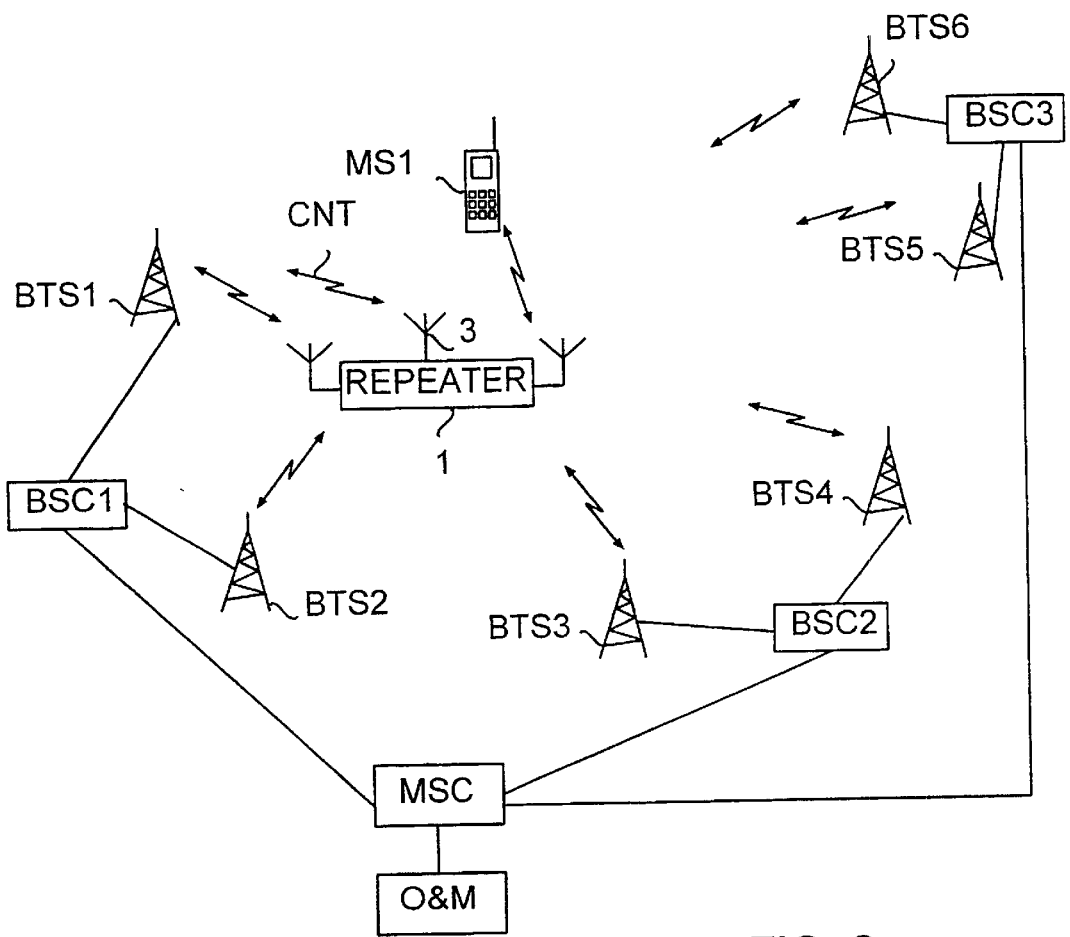
FIG. 2 is a block diagram of a cellular radio system in accordance with principles of the invention.
Figure 3:
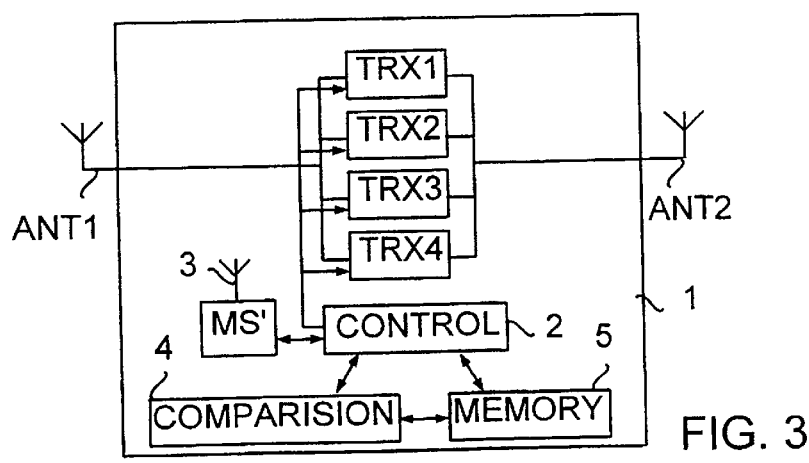
FIG. 3 is a block diagram of the repeater shown in FIG. 2.

FIG. 2 is a block diagram of a cellular radio system and FIG. 3 a block diagram of the repeater shown in FIG. 2. The cellular radio system shown in FIG. 2 may be e.g. the GSM system.

The mobile switching centre MSC shown FIG. 2 communicates with six base stations BTS1 to BTS6 via three base station controllers BSC1 to BSC3. Each base station BTS1 to BTS6 maintains a dedicated radio cell to whose use given frequency channels have been allocated.

In the case of FIG. 2, the system also comprises a repeater 1, which is arranged to repeat signals of the base station BTS1. As is seen from FIG. 3, in this exemplary case the repeater 1 is equipped with two antennas ANT1 to ANT2 and four amplifier units TRX1 to TRX4 for receiving, amplifying and forwarding signals sent by the base station BTS1. Similarly, the repeater receives, amplifies and sends to the base station BTS1 signals of a mobile station MS1.

A transceiver unit MS'0 is integrated into the repeater 1 in a manner known per se, and comprises an antenna 3 via which a telecommunication connection may be established between the repeater 1 and a network management centre O&M for transmitting control signals CNT between them. If required, this connection can be used by the management system to change the settings of the repeater 1 and similarly, the repeater may use this connection to send alarm messages to the management system. In the exemplary case of FIG. 2 the transceiver unit MS' is practically very similar to a GSM system mobile telephone which is connected to the control unit 2 of the repeater.

To further facilitate management of the system of FIG. 2, according to the invention, in frequency channel reconfiguration the transceiver unit MS' is locked to follow the BCCH channel of the base station BTS1 corresponding to the repeater 1. Consequently, the transceiver unit continuously aims at receiving the BCCH channel from which the BSIC code (Base transceiver Station Identity Code) of the base station BTS1 can be found. On said BCCH channel the base station BTS1 sends information related to the radio cell it maintains, including e.g. a traffic channel list BA (Base station Allocation) indicating the frequency channels utilized by the traffic channels of said base station. In accordance with the invention, the transceiver unit MS' of the repeater 1 is adapted to feed said traffic channel list to the control unit 2 of the repeater 1.

The control unit 2 is connected to the amplifier units TRX1 to TRX4 of the repeater 1, whereby it is aware of the frequency channels used by the amplifier units. This allows the control unit 2 to use the comparison unit 4 to compare the frequency channels used by the amplifier units with the frequency channels included in the traffic list. If said comparison indicates that the frequency channels included in the traffic channel list do not correspond to the frequency channels used by the channel units TRX1 to TRX4, the control unit 2 controls the transceiver unit MS' to send a predetermined message to the network management centre O&M of the system. This way the repeater 3 is able to transfer on its own initiative to the management system an alarm in situations where the repeater is tuned to the wrong frequencies. Similarly, the control unit 2 controls the transceiver unit MS' to send an alarm to the network management centre if the transceiver unit is unable to receive the BCCH channel of the base station BTS1 (and consequently, the control unit does not receive the traffic channel list from the transceiver unit). Failure to receive the BCCH channel obviously indicates malfunction at the base station BTS1 or the repeater 1.

In accordance with the invention, the control unit 2 of the repeater may also be programmed to independently adjust the frequency channels of the amplifier units. In other words, when the comparison unit 4 detects that the frequency channels included in the traffic channel list do not correspond to the frequency channels used by the channel units TRX1 to TRX4, the control unit 2 adjusts the amplifier units TRX1 to TRX4 so that their frequencies correspond to the frequency channels included in the traffic channel list, and in addition it sends to the management system the above message indicating a change in frequency. This way the management system is continuously aware of the frequency channels the repeater is tuned to repeat. Even when the management system sends from the network management centre O&M a control message to the repeater 1 for the purpose of changing the frequency channels used by the repeater, the control unit 2 acknowledges the frequency change by sending a predetermined message to the network management centre once it has adjusted the amplifier units TRX1 to TRX4 so that their frequencies correspond to the frequency channels included in the control command.

Since the transceiver unit of the repeater 1 largely corresponds to a GSM system mobile station, it also comprises measurement means for measuring the signal strengths (RSSI; Received Signal Strength Indication) of BCCH channel signals received from adjacent base stations. In accordance with the GSM specifications, a GSM system mobile station should continuously measure the signal strengths of the six best audible base stations. The transceiver unit MS' integrated into the repeater 1 also makes corresponding measurements on signals sent by the base stations BTS1 to BTS6 on BCCH channels, and in addition it makes in order of superiority (the best audible first) a list of the base stations it hears best and with which it could communicate. In accordance with the invention, the transceiver unit MS' inputs this list into the control unit 2 of the repeater 1.

Once the control unit 2 has received the above list from the transceiver unit MS', it stores it in a memory 5, in addition to which it controls the comparison unit 4 to compare the newest list with a corresponding previous list which is also stored in the memory 5. Since the repeater 1 is tuned to repeat the signals of base station BTS1 in particular, said base station should be located first in the list. If not, this probably indicates malfunction at the base station BTS1, and therefore the control unit 2 of the repeater sends an alarm message about this via the transceiver unit MS' to the system network management centre O&M. Similarly, if the comparison unit 4 detects significant changes in the list, i.e. the position of a base station in the list has e.g. come down by several places (i.e. it is clearly less audible than previously), the control unit 2 sends an alarm to the system network management centre O&M via the transceiver unit MS'. Consequently, in accordance with the invention, the management system can use the repeater 1 to monitor the operation of the base stations BTS1 to BTS6.

Even though the above example states that a repeater immediately sends alarm messages to the management system when it detects deviations in frequency channels or in signal strengths, practical implementations of the invention allow given time delays to be defined for the time the repeater waits before it sends alarm messages to the management system. In other words, defining e.g. a delay of about half an hour before transmission of an alarm message when the repeater detects that the signal strengths of signals received from the corresponding base station are weaker than the signal strengths of signals received from other base stations, allows avoidance of unnecessary alarms caused by temporary disturbances.

It is to be understood that the above specification and the related figures are only intended to illustrate the present invention. Different variations and modifications of the invention are obvious to a person skilled in the art without deviating from the scope and spirit of the invention disclosed in the attached claims.

What is claimed is:

1. A method of monitoring the operation of a cellular radio system in a system comprising at least one base station and a repeater tuned to repeat signals sent by the at least one base station on traffic channels, and in which system the at least one base station sends over the radio path a traffic channel list including traffic channels at disposal of the at least one base station, the method comprising:
    receiving the traffic channel list sent by the base station;
    comparing the traffic channels included in the traffic channel list with the traffic channels used by the repeater, and
    giving an alarm if the traffic channels used by the repeater differ from the traffic channels included in the traffic channel list.
2. A method as claimed in claim 1, wherein the cellular radio system comprises a repeater management system, and wherein the giving the alarm includes sending a predetermined message to the repeater management system.
3. A method as claimed in claim 2, wherein said predetermined message comprising information on at least the traffic channels the repeater has at its disposal.
4. A method as claimed in claim 1, further comprising measuring signal strengths of signals the repeater receives from different base stations,
    comparing the measured signal strengths with each other, and
    giving an alarm if said comparison indicates that the strongest signals received by the repeater have been sent by some other base station than said base station whose signals the repeater has been tuned to repeat.
5. A repeater in a cellular radio system, the repeater comprising:
    amplifier units for receiving, amplifying and forwarding signals sent by a first base station on traffic channels, and
    a transceiver unit for setting up a signalling connection to other system parts to transfer control signals between the repeater and other network parts, the transceiver unit being adapted to receive a traffic channel list sent by the first base station over the radio path and including the traffic channels at the base station's disposal,
    comparison means for comparing the traffic channels included in the traffic channel list with the channels used by the amplifier units, and
    the transceiver unit comprising means for sending a predetermined message to a management system of the system when the comparison means indicate that the channels used by the amplifier units of the repeater differ from the traffic channels included in the traffic channel list.
6. A repeater as claimed in claim 5, wherein the transceiver unit comprising means for sending a predetermined message to the management system of the system when the transceiver unit is unable to receive signals sent by the first base station.
7. A repeater as claimed in claim 5 or 6, wherein said predetermined message sent by the transceiver unit including information on at least the channels to which the amplifier units of the repeater have been tuned.
8. A repeater as claimed in claim 5, wherein the repeater comprises measuring means for measuring signal strengths of signals received by its transceiver unit from different base stations, and
    the transceiver unit comprising means for sending a second predetermined message to the management system of the system after the transceiver unit has received from another base station signals having stronger signal strengths than those received from the first base station.
9. A repeater as claimed in claim 5, further comprising measuring means for measuring signal strengths of signals received by its transceiver unit from different base stations,
    means for storing measurement results obtained from signals of said different base stations in a memory and for comparing said measurement results with corresponding previous measurement results obtained from the same different base stations earlier in time, and
    the transceiver unit comprising means for sending a second predetermined message to the management system of the system if the comparison of measurement results indicates that the transceiver unit has received signals from a given base station at a significantly weaker signal strength than previously.

10. A repeater as claimed in claim 5, further comprising control means for adjusting its amplifier units to use the traffic channels included in the traffic channel list sent by the first base station when the comparison means indicates that the traffic channels used by the amplifier units of the repeater differ from the traffic channels included in the traffic channel list, and wherein the transceiver unit comprises means for sending a message to the management system in response to the adjustment of the channels of the amplifier units, said message including information on at least the channels to which the amplifier units are adjusted.

11. A repeater as claimed in claim 5, further comprising measuring means for measuring signal strengths of signals received by its transceiver unit from different base stations; and means for storing measurement results obtained from signals of said different base stations in a memory and for comparing said measurement results with corresponding previous measurement results obtained from different base stations earlier in time, and wherein the transceiver unit comprises means for sending a second predetermined message to the management system of the system if the comparison of measurement results indicates that the transceiver unit has received signals from a given base station at a significantly weaker signal strength than previously.

12. A cellular radio system comprising:

a base station configured to send signals on traffic channels over a radio path; and a repeater including amplifier units for receiving, amplifying and forwarding signals sent by the base station on traffic channels, and a transceiver unit for setting up a signalling connection to other system parts to transfer control signals between the repeater and other network parts, the transceiver unit being adapted to receive a traffic channel list sent by the base station over the radio path and including the traffic channels at the base station's disposal, comparison means for comparing the traffic channels included in the traffic channel list with the channels used by the amplifier units, the transceiver unit including means for sending a predetermined message to a management system of the system when the comparison means indicate that the channels used by the amplifier units of the repeater differ from the traffic channels included in the traffic channel list.

\* \* \* \* \*